United States Patent
Mansour

(10) Patent No.: US 10,360,026 B1
(45) Date of Patent: Jul. 23, 2019

(54) SYSTEM, METHOD, AND COMPUTER PROGRAM FOR RPM VERSIONING

(71) Applicant: Amdocs Development Limited, Limassol (CY)

(72) Inventor: Edwar Adib Mansour, Upper Galilee (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 15/806,170

(22) Filed: Nov. 7, 2017

(51) Int. Cl.
*G06F 8/61* (2018.01)
*G06F 8/71* (2018.01)

(52) U.S. Cl.
CPC . *G06F 8/71* (2013.01); *G06F 8/61* (2013.01)

(58) Field of Classification Search
CPC .......................................................... G06F 8/61
USPC ............................................................ 717/175
See application file for complete search history.

(56) References Cited

U.S. PATENT DOCUMENTS

| | | | |
|---|---|---|---|
| 7,222,341 B2 | 5/2007 | Forbes et al. | |
| 8,122,446 B2* | 2/2012 | Moore | G06F 8/61 717/174 |
| 8,161,473 B2* | 4/2012 | Norrie | G06F 8/60 717/174 |
| 8,640,119 B2 | 1/2014 | Vidal et al. | |
| 8,707,293 B2* | 4/2014 | Festi | G06F 9/445 717/174 |
| 8,863,114 B2* | 10/2014 | Shah | G06F 8/60 717/175 |
| 8,997,083 B2 | 3/2015 | Vidal et al. | |
| 9,448,780 B1 | 9/2016 | Hall | |
| 2006/0020937 A1* | 1/2006 | Schaefer | G06F 8/61 717/175 |
| 2008/0320465 A1* | 12/2008 | Kinder | G06F 8/61 717/170 |
| 2011/0131566 A1* | 6/2011 | Vidal | G06F 8/65 717/175 |
| 2012/0096453 A1* | 4/2012 | Meilstrup | G06F 8/61 717/175 |
| 2014/0282492 A1* | 9/2014 | Shimizu | G06F 8/61 717/175 |
| 2016/0283218 A1* | 9/2016 | Wei | G06F 8/63 |

OTHER PUBLICATIONS

Sylvain Leroux; "Tar vs Zip vs Gz: Difference and Efficiency"; It's FOSS website [full URL in ref.]; Feb. 6, 2017 (Year: 2017).*
Tim OBrien; "Why Nexus?" for the Non-Programmer; Sonatype.com blog website [full URL in ref.]; Apr. 12, 2010 (Year: 2010).*
"RPM File Format"; RMP.org website [full URL in ref.] as captured by the Wayback Machine Internet Archive on Jul. 12, 2017 (Year: 2017).*
McLaren Software, " DocLoader: Globally renowned bulk and batch loading import tool for EMC Documentum," retrieved on Nov. 7, 2017, pp. 1-3, retrieved from http://www.mclarensoftware.com/products/docloader.aspx.

* cited by examiner

*Primary Examiner* — Qing Chen
*Assistant Examiner* — Clint Thatcher
(74) *Attorney, Agent, or Firm* — Zilka-Kotab, P.C.

(57) ABSTRACT

A system, method, and computer program product are provided for RPM versioning. In operation, a system identifies a RPM package for installation. The system generates versioning files and dictionary files corresponding to the RPM package separately during a build of DA units. Moreover, the system uploads the versioning files and the dictionary files to a Nexus repository.

11 Claims, 6 Drawing Sheets

```
# Activation here will deploy/redeploy the ear
- name: Activate Agent EAR
  shell: /opt/amdocs/cpq/{{ item.key }}/activate.sh
  with_dict: "{{customer_ms_version}}"
``` amdocs-oms-prod-dev-version.yml
```
amdocs-oms-prod-core:
  - key: amdocs-oms-prod-core
    name: amdocs-oms-prod-core
    version: 10.0.0.16
``` amdocs-oms-prod-dev.yml
```
amdocs-oms-prod-core:
  - activate: true
    application_name: oms
    key: amdocs-oms-prod-core
    name: amdocs-oms-prod-core
```

FIGURE 3

SYSTEM, METHOD, AND COMPUTER PROGRAM FOR RPM VERSIONING

FIELD OF THE INVENTION

The present invention relates to RPM package installation, and more particularly to a system for handling versioning associated with RPM package installation.

BACKGROUND

The industry standards for RPM package installation is to use the latest available version in a repository. Current configuration of Nexus repositories does not allow systems to fully implement these standards (e.g. all foundation releases are under the same repository, etc.).

There is thus a need for addressing these and/or other issues associated with the prior art.

SUMMARY

A system, method, and computer program product are provided for RPM versioning. In operation, a system identifies a RPM package for installation. The system generates versioning files and dictionary files corresponding to the RPM package separately during a build of Deployment Aspect (DA) units. Moreover, the system uploads the versioning files and the dictionary files to a Nexus repository.

BRIEF DESCRIPTION OF THE DRAWINGS

FIG. 3 shows examples illustrating scripts for RPM versioning, in accordance with one embodiment.

DETAILED DESCRIPTION

Figure 1:
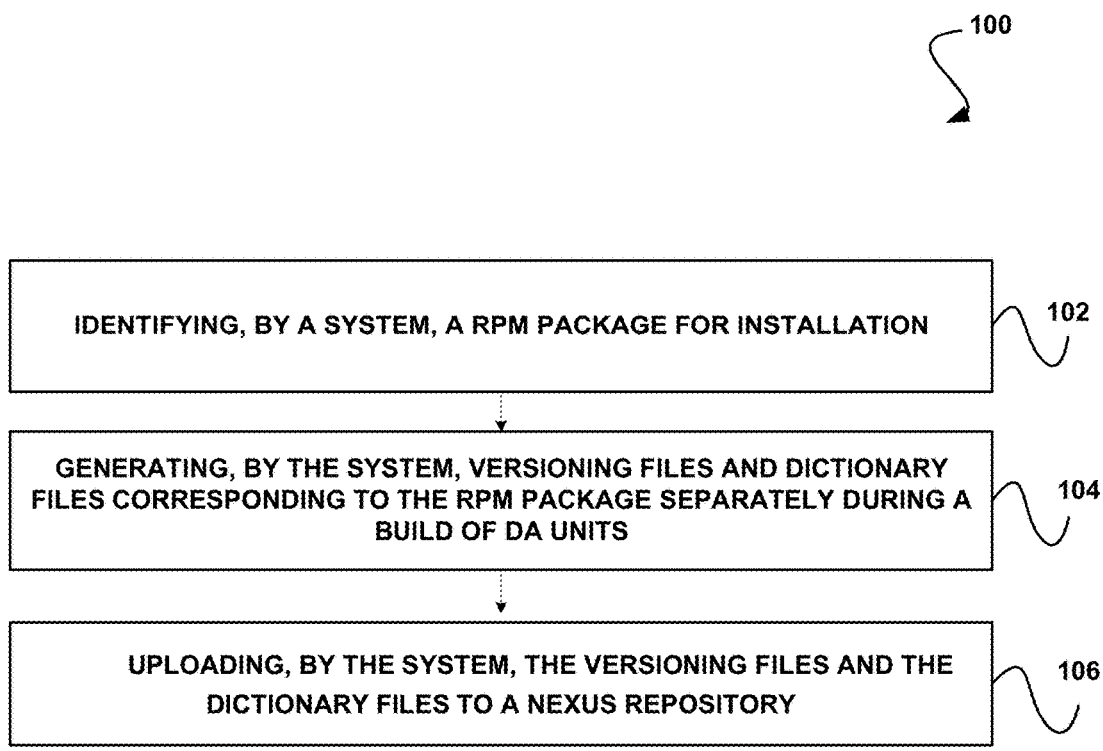
FIG. 1 illustrates a method for RPM versioning, in accordance with one embodiment.

FIG. 1 illustrates a method 100 for RPM versioning, in accordance with one embodiment.

In operation, a system identifies a RPM package for installation. See operation 102. The system generates versioning files and dictionary files corresponding to the RPM package separately during a build of Deployment Aspect (DA) units. See operation 104. Moreover, the system uploads the versioning files and the dictionary files to a Nexus repository. See operation 106.

In one embodiment, the versioning files may include only name attributes, key attributes, and version attributes. In another embodiment, other data may be present in the versioning files.

Further, in one embodiment, the dictionary files may include only name attributes, key attributes, and application attributes. In another embodiment, other data may be present in the library files.

The system may also function such that a build of an orchestration module pulls required Deployment Aspect Unit (DAU) configuration information and creates a playbook TAR (Tape ARchive) file. Further, a module associated with the system may determine how to install the RPM package associated with the versioning files and the dictionary files.

Deployment Aspects and Deployable Aspect Units are composed of one or more Deployable Units. They are responsible for the installation of corresponding Deployable Units and execution of the provisioning time activation logic. Some examples include security provisioning aspects, WLS provisioning aspects, AVM Host provisioning aspects, etc.

Deployable Units represent a software building block, independently built, versioned and delivery and are the minimal delivery unit for software fixes. Deployable Units include binaries, related static configuration and the logic to configure/reconfigure the unit.

It should be noted that the method 100 may be implemented utilizing various systems, hardware, software, applications, user interfaces, etc., as dictated by the implementer. For example, the system implementing the method 100 may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
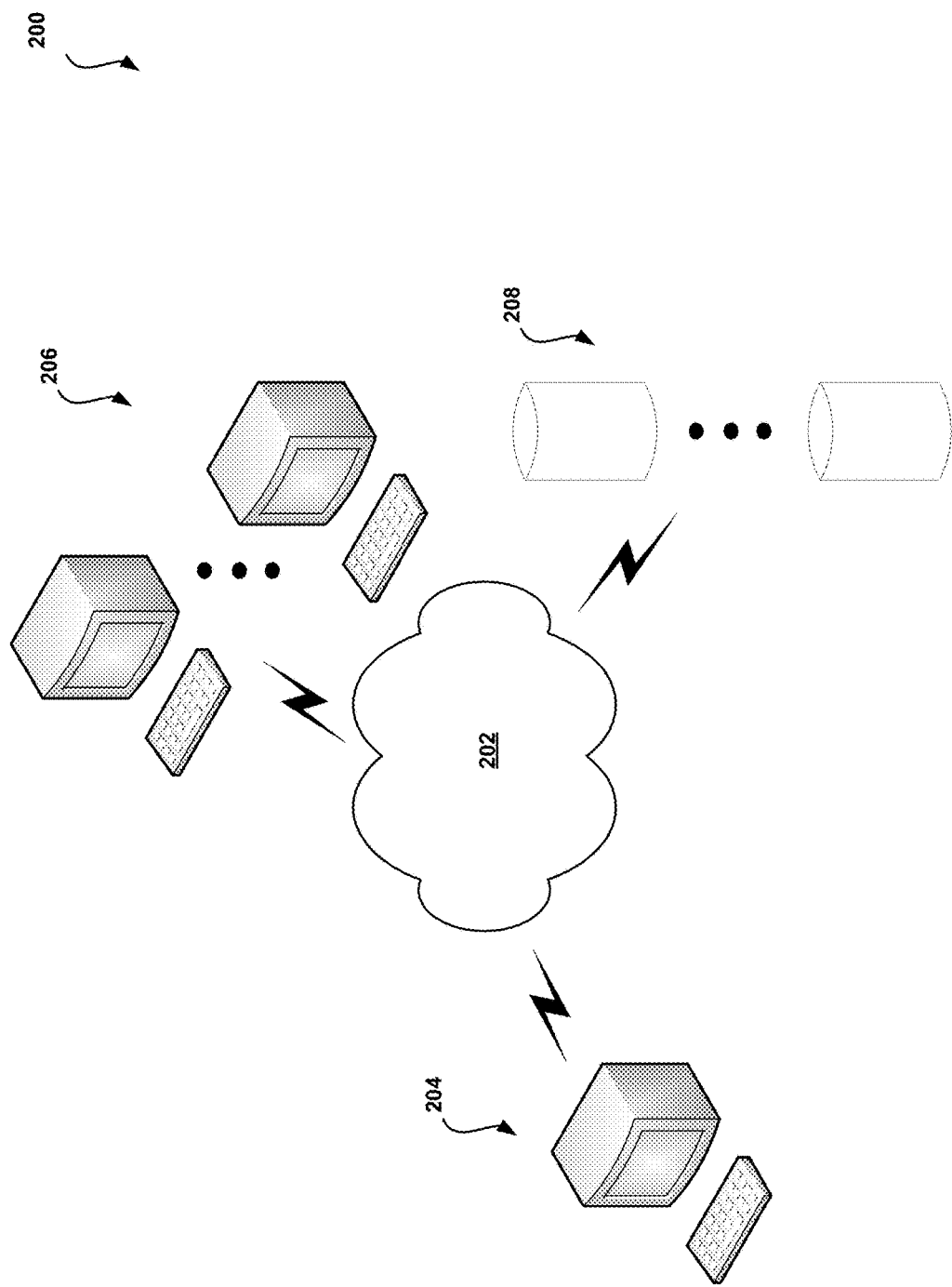
FIG. 2 shows a system for RPM versioning, in accordance with one embodiment.

FIG. 2 shows a system 200 for RPM versioning, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a system 204, which may implement a variety of applications or software, etc. The system 204 may be capable of communicating with a plurality of systems 206, either directly or over one or more networks 202, for generating versioning files and dictionary files corresponding to a RPM package. The system 204 may also be in communication with one or more repositories/databases 208.

The industry standards for RPM packages installation is to use the latest available version in the repository. In order to be compliant with the industry standards, working with yum without supplying the hard-coded version, the system 204 will allow companies to gradually move away from using the yaml configuration files with the version.

In one embodiment, the system 204 may include two main features, a versioning utility and a yum module. During the build of the DA units, the versioning utility of the system 204 may generate the versioning and dictionary configuration files and upload them to a Nexus repository.

The build of the orchestration module may pull the required DAU configuration and create a playbook tar file. At the installation time, the yum module may determine how to install the RPM package.

In operation, the system 204 may support customization layers working with specific core releases; support customization layers working with specific MPS releases/additional layers; handle dependences internally and obsoletes between the layers; support a modularity concept via deployment aspects units aggregations; and/or support working with/without version yaml.

FIG. 3 shows examples 300 illustrating scripts for RPM versioning, in accordance with one embodiment. As an option, the examples 300 may be implemented in the context of the details of the previous figures and/or any subsequent figure(s). Of course, however, the examples 300 may be implemented in the context of any desired environment. Further, the aforementioned definitions may equally apply to the description below.

The script 302 shows code for generating a dictionary, containing the rpm packages, used in product orchestrations. In order to continue to support products that use the dictionaries, containing the RPM packages list, in their orchestration, the generated files are separated to the version files and the dictionary files.

The version files will now contain only the name/key and the version attributes, as shown in example 304. The dictionary files will now contain the name/key and other application attributes, but no version, as shown in example 306.

Figure 4:
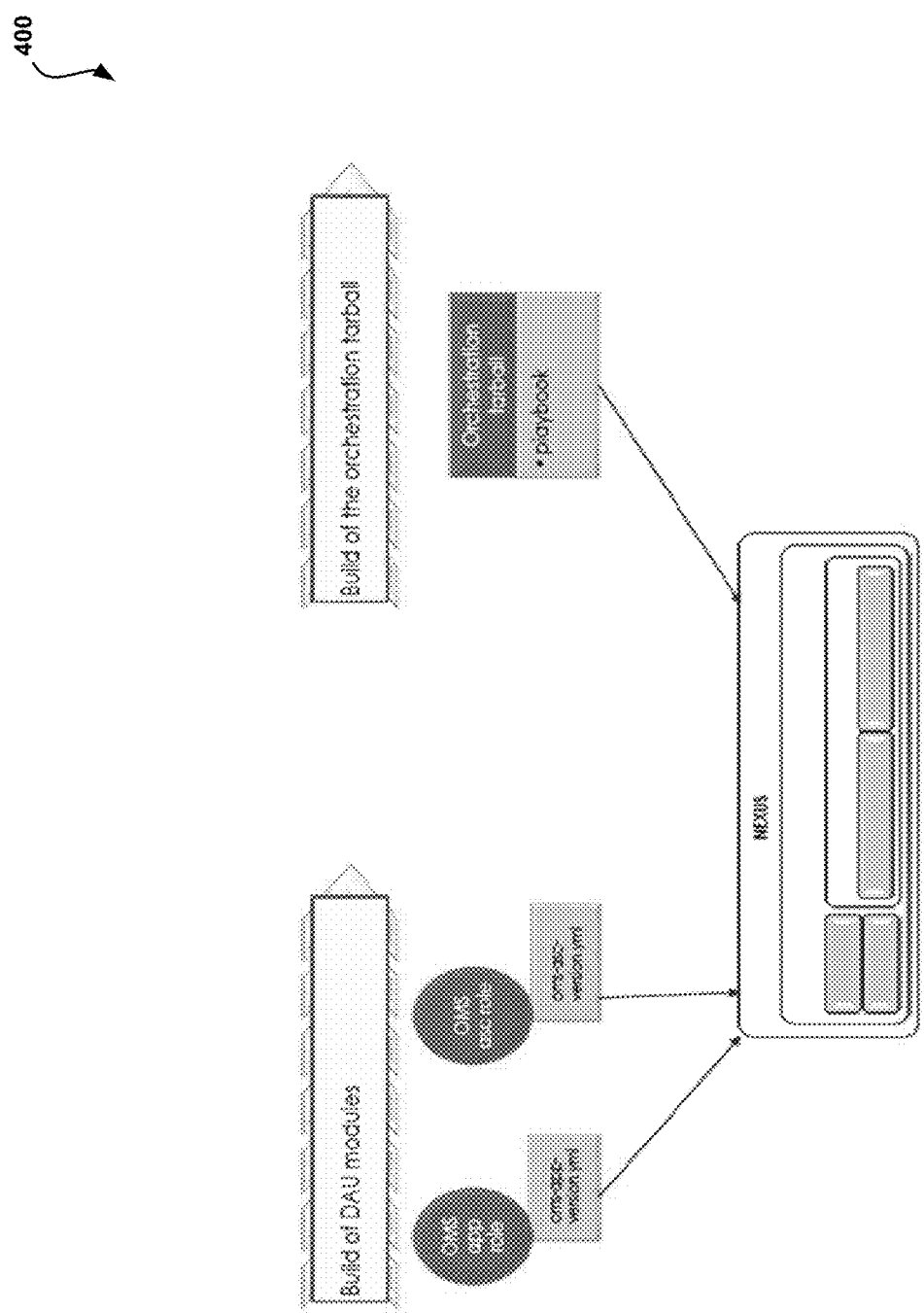
FIG. 4 shows a system flow diagram for RPM versioning, in accordance with one embodiment.

FIG. 4 shows a system flow diagram 400 for RPM versioning, in accordance with one embodiment. As an option, the diagram 400 may be implemented in the context of the details of the previous figures and/or any subsequent figure(s). Of course, however, the diagram 400 may be implemented in the context of any desired environment. Further, the aforementioned definitions may equally apply to the description below.

In one embodiment, the system may use a yum_module, which may include a module that supports the gradual move from the hard-coded version in playbook configuration files. The module may work with the name of the top level RPM package and the desired state and check to determine whether it is defined in the yaml configuration files. If it is, the RPM packages are installed according to the given version. If it is not, the packages may be installed using the default yum module behavior.

Figure 5:
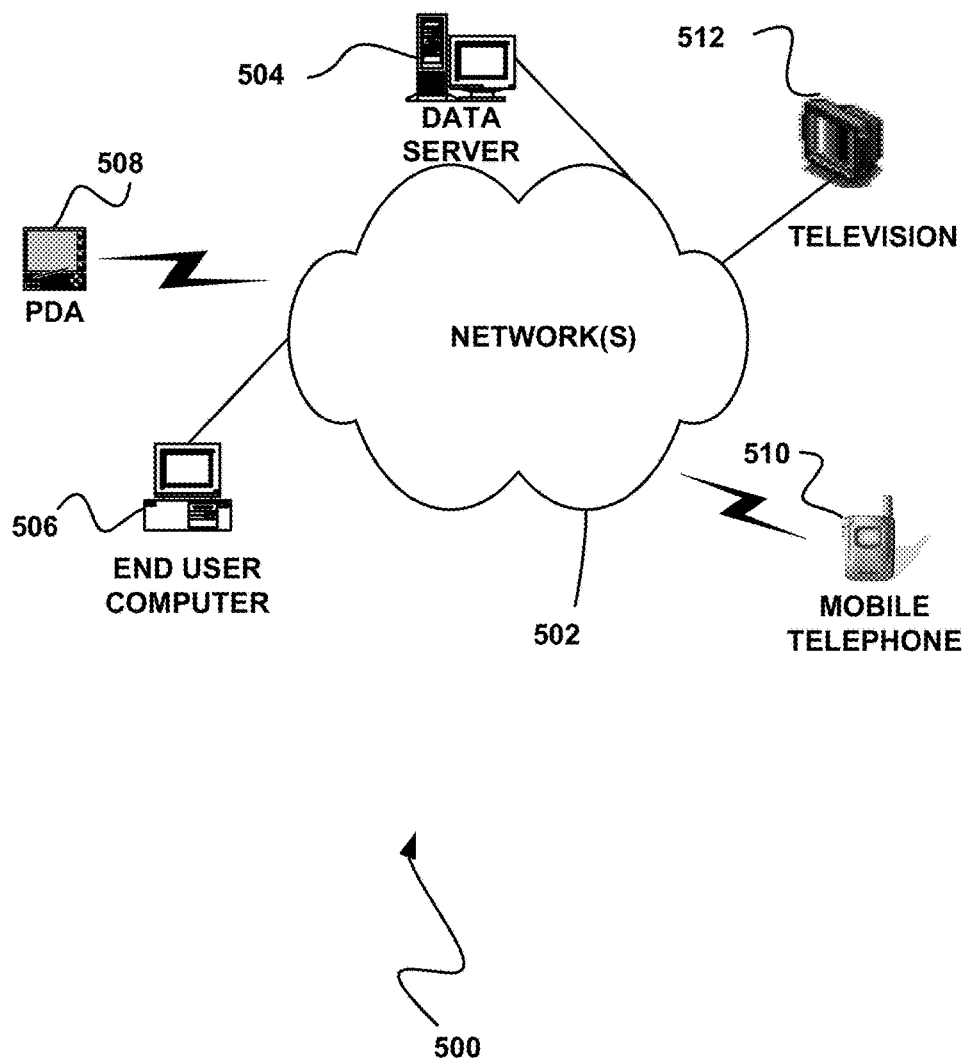
FIG. 5 illustrates a network architecture, in accordance with one possible embodiment.

FIG. 5 illustrates a network architecture 500, in accordance with one possible embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 504 and an end user computer 506 may be coupled to the network 502 for communication purposes. Such end user computer 506 may include a desktop computer, lap-top computer, and/or any other type of logic. Still yet, various other devices may be coupled to the network 502 including a personal digital assistant (PDA) device 508, a mobile phone device 510, a television 512, etc.

Figure 6:
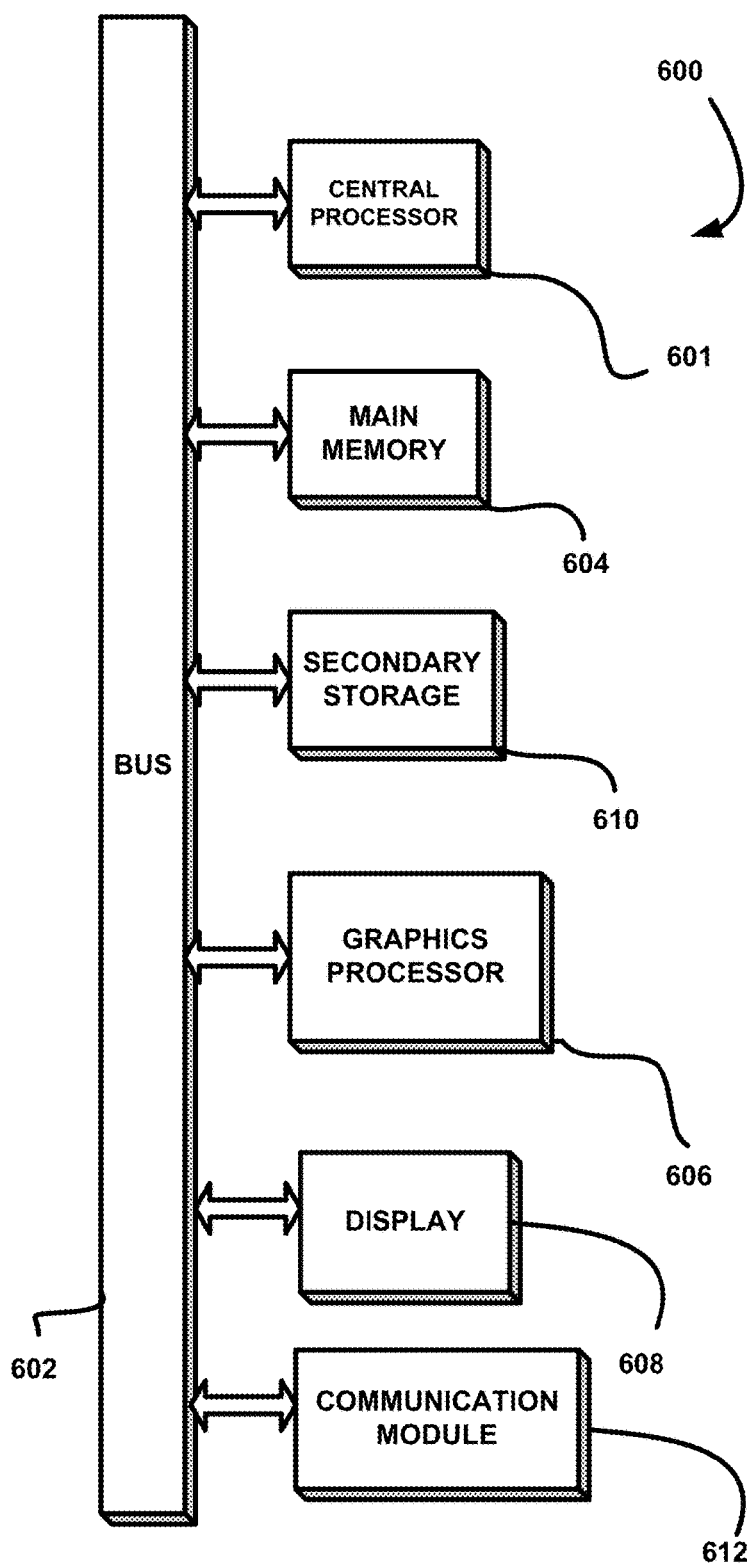
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. Of course, the system 600 may be implemented in any desired environment.

As shown, a system 600 is provided including at least one central processor 601 which is connected to a communication bus 602. The system 600 also includes main memory 604 [e.g. random access memory (RAM), etc.]. The system 600 also includes a graphics processor 606 and a display 608.

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 604, the secondary storage 610, and/or any other memory, for that matter. Such computer programs, when executed, enable the system 600 to perform various functions (as set forth above, for example). Memory 604, storage 610 and/or any other storage are possible examples of non-transitory computer-readable media.

The system 600 may also include one or more communication modules 612. The communication module 612 may be operable to facilitate communication between the system 600 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   identifying, by a system, a RPM package for installation;
   during a build of a plurality of software building blocks, generating separately, by the system, for the RMP package:
      versioning files containing only name attributes, key attributes, and version attributes, and
      dictionary files containing the name attributes, the key attributes, and application attributes without a version;
   uploading, by the system, the versioning files and the dictionary files to a Nexus repository for storage therein;
   providing continued support of products that use dictionaries associated with dictionary files via the separately generated and stored versioning files and dictionary files.

2. The method of claim 1, wherein the dictionary files do not include the version attributes.

3. The method of claim 1, wherein a build of an orchestration module creates a playbook TAR (Tape ARchive) file.

4. The method of claim 1, wherein a module associated with the system determines how to install the RPM package associated with the versioning files and the dictionary files.

5. A computer program product embodied on a non-transitory computer readable medium, comprising computer code for:
   identifying, by a system, a RPM package for installation;
   during a build of a plurality of software building blocks, generating separately, by the system, for the RMP package:
      versioning files containing only name attributes, key attributes, and version attributes, and
      dictionary files containing the name attributes, the key attributes, and application attributes without a version;
   uploading, by the system, the versioning files and the dictionary files to a Nexus repository for storage therein;
   providing continued support of products that use dictionaries associated with dictionary files via the separately generated and stored versioning files and dictionary files.

6. The computer program product of claim 5, wherein the dictionary files do not include the version attributes.

7. The computer program product of claim 5, wherein a build of an orchestration module creates a playbook TAR (Tape ARchive) file.

8. The computer program product of claim 5, wherein a module associated with the system determines how to install the RPM package associated with the versioning files and the dictionary files.

9. A system, comprising one or more processors, operable for:
- identifying, by the system, a RPM package for installation;
- during a build of a plurality of software building blocks, generating separately, by the system, for the RMP package:
  - versioning files containing only name attributes, key attributes, and version attributes, and
  - dictionary files containing the name attributes, the key attributes, and application attributes without a version;
- uploading, by the system, the versioning files and the dictionary files to a Nexus repository for storage therein;
- providing continued support of products that use dictionaries associated with dictionary files via the separately generated and stored versioning files and dictionary files.

10. The system of claim 9, wherein the dictionary files do not include the version attributes.

11. The system of claim 9, wherein a build of an orchestration module creates a playbook TAR (Tape ARchive) file.

* * * * *